United States Patent [19]

Takagawa

[11] Patent Number: 4,586,125
[45] Date of Patent: Apr. 29, 1986

[54] NUMERICAL CONTROL WORKING SYSTEM

[75] Inventor: Kiyoshi Takagawa, Aichi, Japan

[73] Assignee: Mitsubishi Denki Kabushiki Kaisha, Tokyo, Japan

[21] Appl. No.: 529,774

[22] Filed: Sep. 6, 1983

[30] Foreign Application Priority Data

Sep. 3, 1982 [JP] Japan ................................ 57-153509

[51] Int. Cl.⁴ ...................... G06F 15/46; G05B 19/18
[52] U.S. Cl. ...................................... 364/167; 82/2 B; 318/567; 364/171; 364/474
[58] Field of Search ................. 364/167–171, 364/188, 189, 191–193, 474, 475; 82/2 B, 3, 12, 14 E, 25, 36 R, 36 A; 318/567, 568, 569; 340/722, 753, 754

[56] References Cited

U.S. PATENT DOCUMENTS 4,115,858  9/1978  Kaufman ..................... 364/171 X
4,393,449  7/1983  Takeda et al. ............... 364/171 X
4,424,569  1/1984  Imazeki et al. .............. 364/167 X Primary Examiner—Joseph Ruggiero
Attorney, Agent, or Firm—Sughrue, Mion, Zinn Macpeak & Seas

[57] ABSTRACT

An NC working system is characterized in that a working period consisting of periods of time for travelling and idling for respective tool rests of a lathe or the like is obtained by an automatic program, the thus obtained working periods are simultaneously displayed as a bar graph on a display, and the periods of travelling time and idling time are made shiftable for correction on the display, so as to reduce the working period.

4 Claims, 7 Drawing Figures

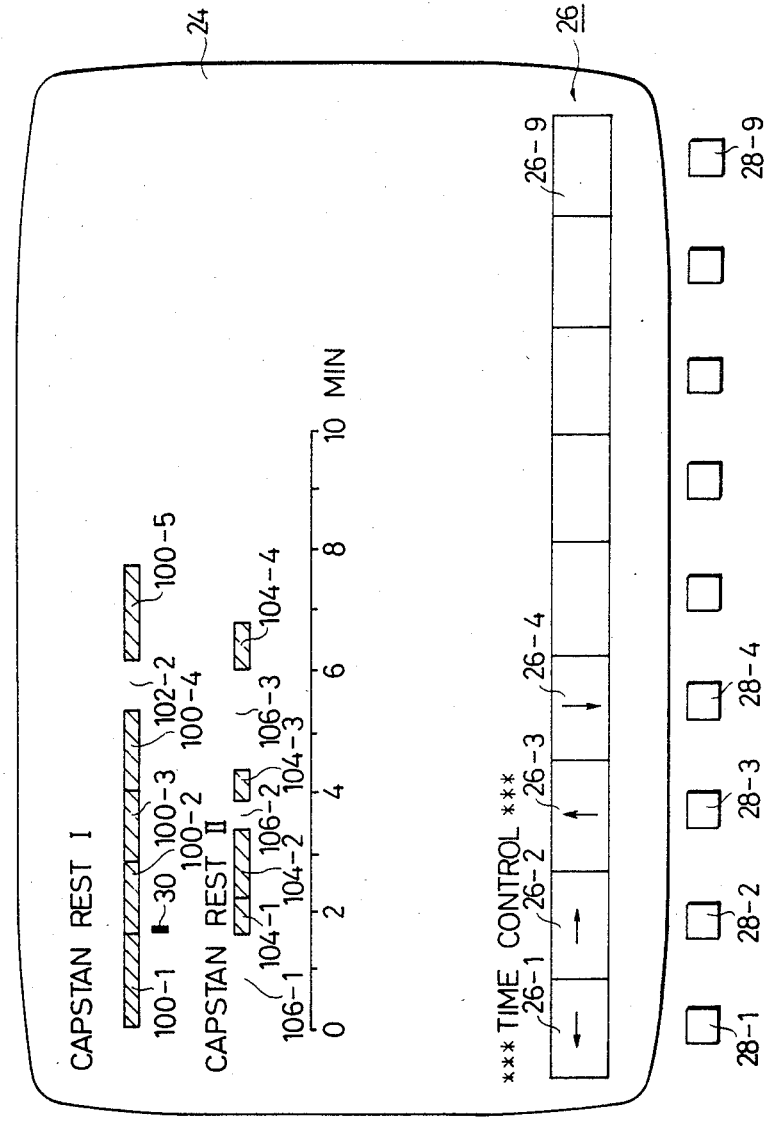

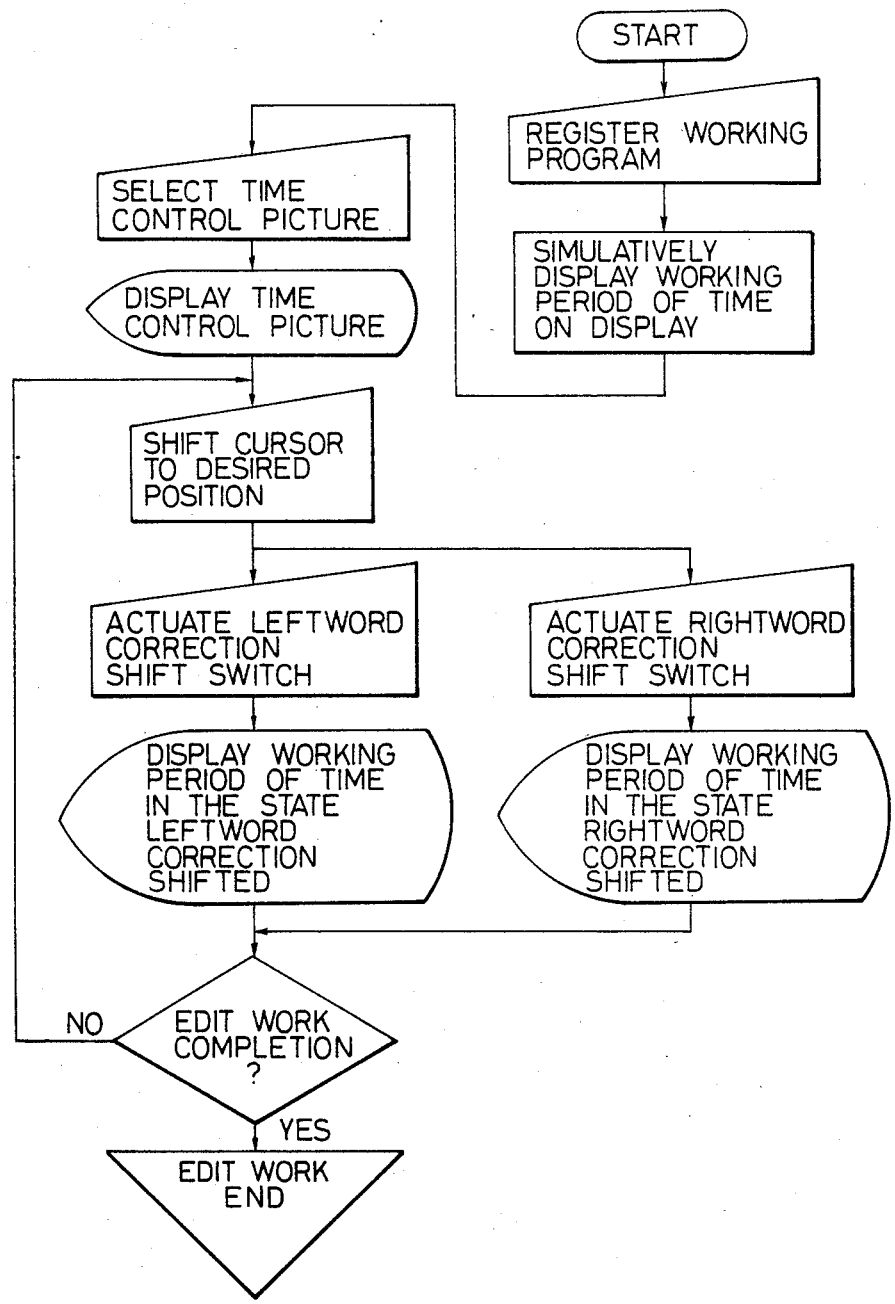

NUMERICAL CONTROL WORKING SYSTEM

BACKGROUND OF THE INVENTION

The present invention relates to an improvement in a numerical control (hereinafter referred to as an NC) working system.

An NC working system serves to command and control the position of a tool with respect to an object to be worked (workpiece) by numerical information corresponding to the position, so as to perform machining of the workpiece. According to an NC working system, complex shapes can be formed easily and accurately with improved producibility. With respect to a working machine such as a lathe utilizing an NC working system, it has been proposed to use a lathe having double tool rests. FIG. 1 shows the outline of such a lathe.

In FIG. 1, a workpiece 12 is positioned and fixed by a chuck 10 rotatable about an axis of rotation (Z-axis), the workpiece 12 being supported at one end by a tip portion 14a of a tail stock 14. Cutting tools 20 and 22 for performing machining on the workpiece 12 are fixed on first and second capstan rests 16 and 18 (rests I, II) respectively. In machining the workpiece 12, the first and second capstan rests 16 and 18 are moved in the Z-direction as shown by an arrow, to cause the cutting tools 20 and 22 to machine the workpiece 12.

In FIG. 2, the period of working time of each of the first and second capstan rests 16 and 18 is shown in the form of a Gantt chart, the period of working time consisting of the periods of time of travelling and idling of each of the capstan rests. That is, the working period of the first capstan rest 16 consists of travelling periods 100-1–100-5 and idling periods 102-1 and 102-2, while the working period for the second capstan rest 18 consists of travelling periods 104-1–104-4 and idling periods 106-1–106-3.

In the conventional NC working system, there is a problem in that the working period is sometimes lengthy because the working period for each capstan rest is obtained by an automatic program, and actual working is performed according to the thus obtained period. For example, there is a disadvantage in some cases in that the working period is lengthy, because the travelling period 100-2 of the first capstan rest 16 is set after the travelling period 104-1 of the second capstan rest 18 as shown in FIG. 2, although both the travelling periods 104-1 and 100-2 can be set at the same time. Actual working is performed in accordance with the Gantt chart of FIG. 2, resulting in an increased working period.

SUMMARY OF THE INVENTION

The present invention has been attained in view of this problem in the prior art, and an object of the present invention is to provide an NC working system in which the working time can be reduced.

To attain the above-mentioned object, the NC working system according to the present invention is characterized in that a working period consisting of periods of time for travelling and idling for respect tool rests is obtained by an automatic program, the thus obtained working period is simulatively displayed as a bar graph on a display, and the periods of travelling time and idling time are shifted for correction on the display, so as to reduce the working period.

BRIEF DESCRIPTION OF THE DRAWINGS

FIGS. 5 and 6 are explanatory diagrams showing the displayed states on the display according to this embodiment of the present invention; and FIG. 7 is a flowchart according to this embodiment of the present invention.

DETAILED DESCRIPTION OF THE PREFERRED EMBODIMENTS

Figure 1:
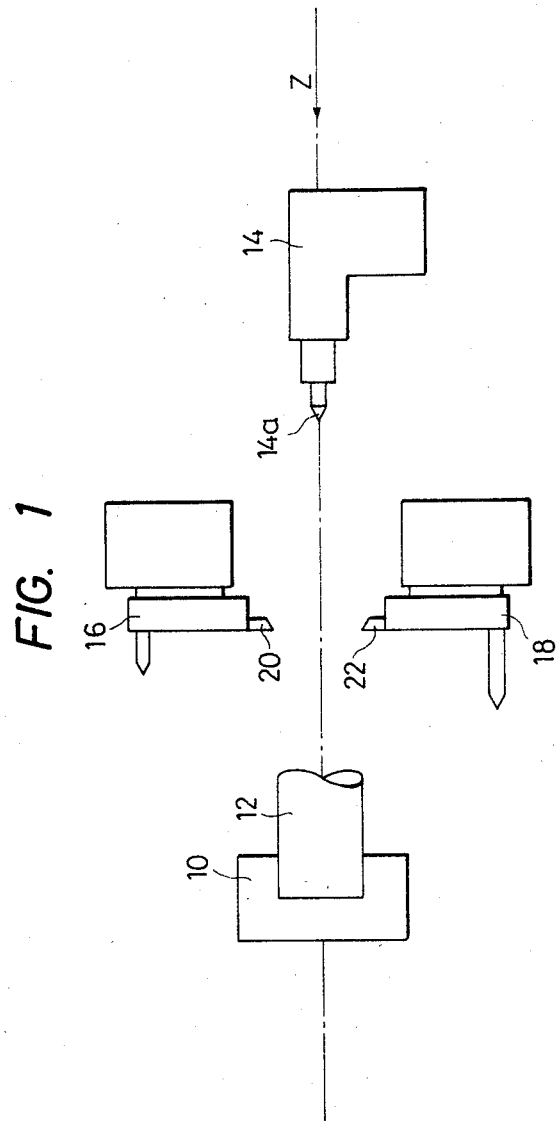
FIG. 1 is an explanatory diagram showing the outlines of a lathe having double tool rests.
Figure 2:
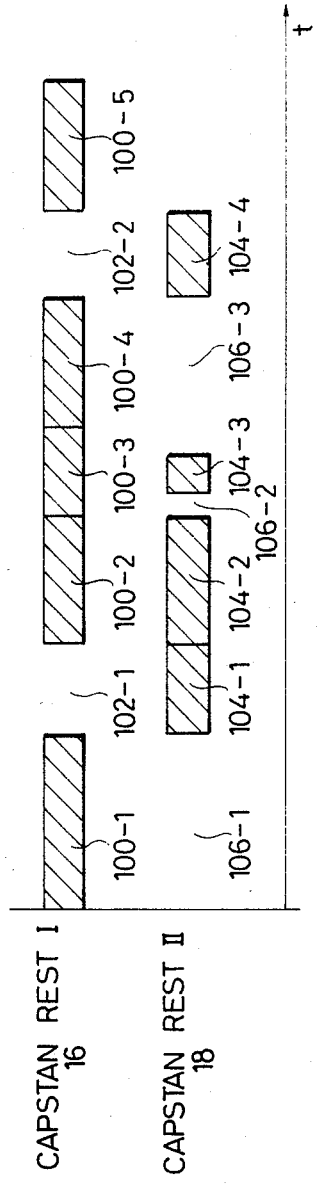
FIG. 2 is a Gantt chart showing the conventional working period.
Figure 3:
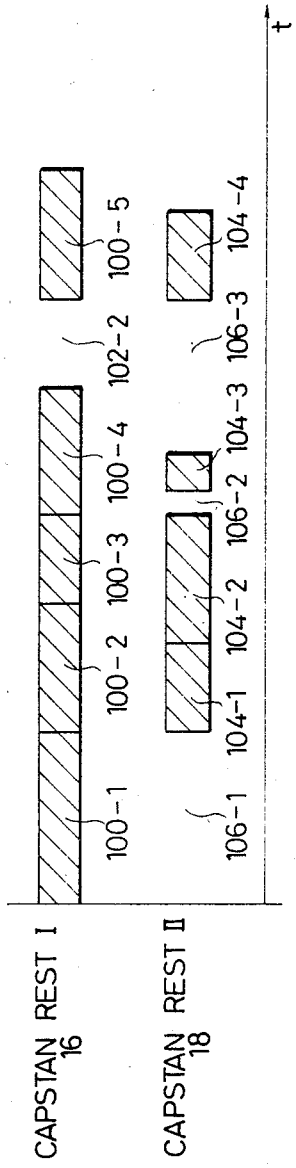
FIG. 3 is a Gantt chart showing the working period according to the principle of the present invention.

In FIG. 3, a Gantt chart according to the principle of the present invention is shown, in which, as is apparent in comparison with FIG. 2, the travelling periods 100-2–100-5 and the idling period 102-2 of the first capstan rest 16 are shifted leftwardly for correction so as to make unnecessary the idling period 102-1 of the first capstan rest 16. Thus, according to the principle of the present invention, it is possible to attain a reduction in the working time.

The numerically controlled tool using the first and second rests may be a lathe apparatus of, for example, the type described in copending U.S. application Ser. No. 532,133, filed Sept. 14, 1983 by Tomomitsu Niwa, commonly assigned, the disclosure of which is hereby incorporated by reference in its entirety.

Figure 4:
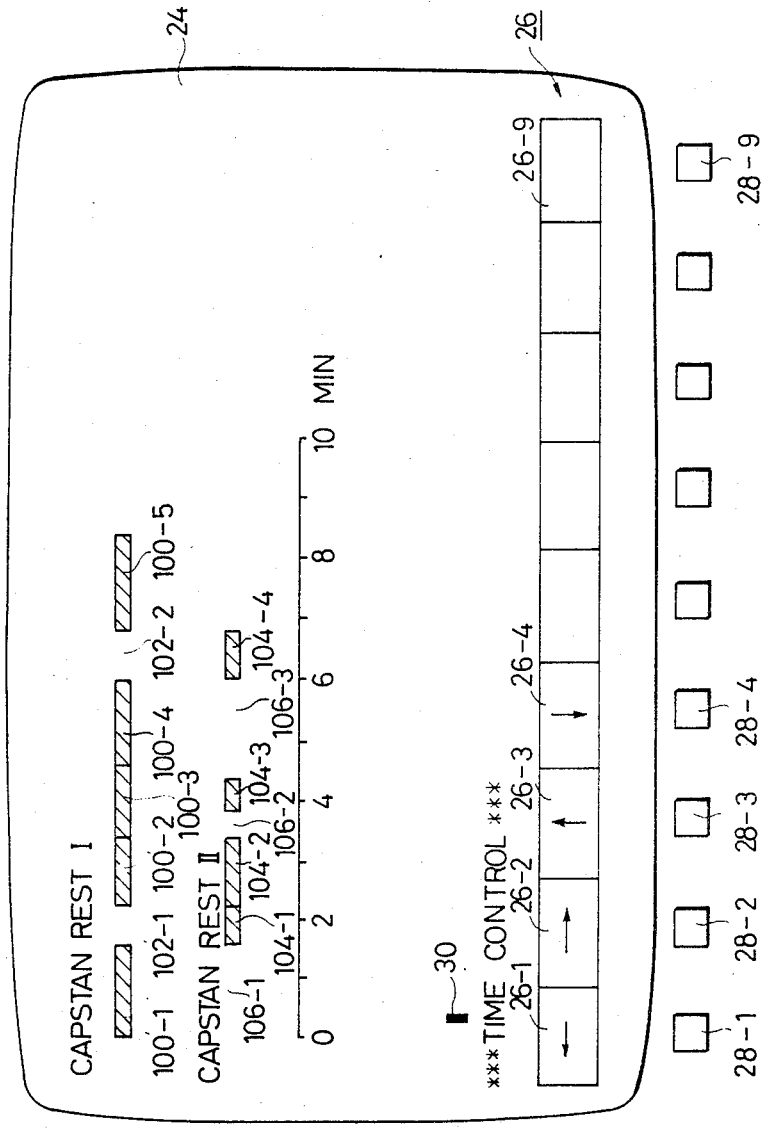
FIG. 4 is an explanatory diagram showing a preferred embodiment of a display for achieving the NC working system according to the present invention.

FIG. 4 shows a preferred embodiment of the display for achieving the NC working system according to the present invention.

In FIG. 4, on the picture face of a display 24, the respective working periods for the first and second capstan rests are displayed, and a menu display portion 26 for displaying nine menu items 26-1–26-9 is reserved. Menu selection switches 28-1–28-9 for selecting the items 26-1–26-9 are provided below the display 24 corresponding to the menu items 26-1–26-9.

Figure 5:
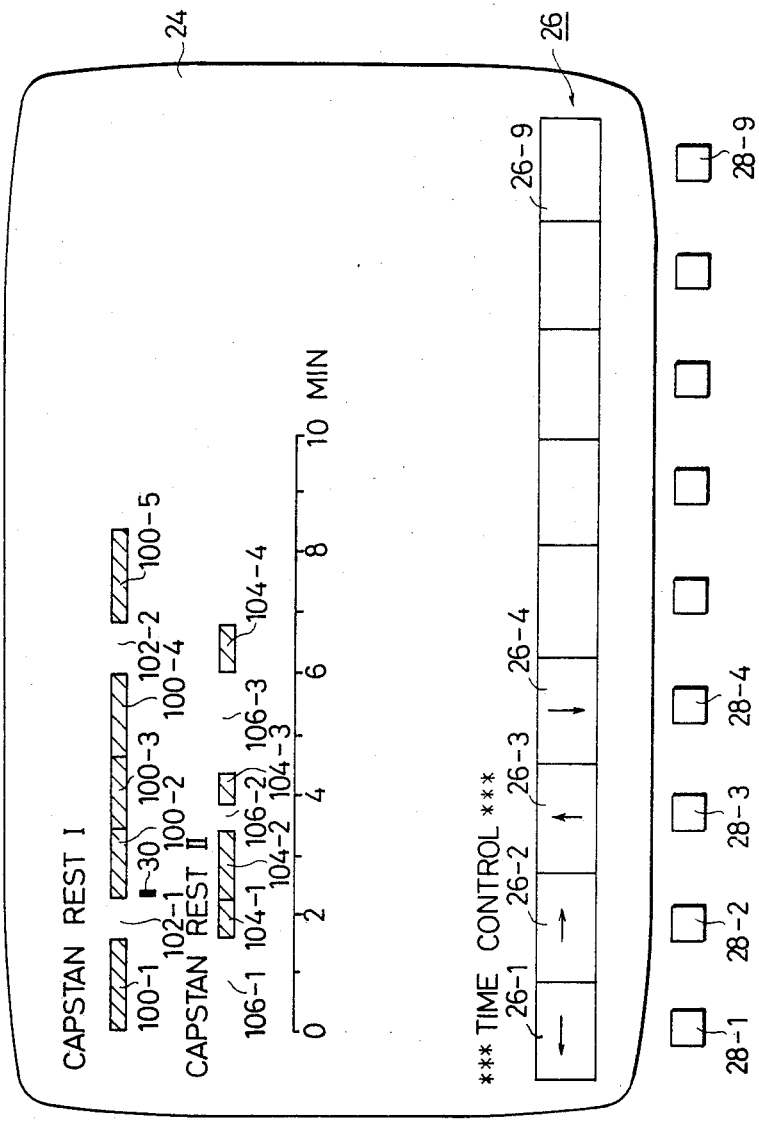

Referring to FIGS. 4 and 5, showing the state of the picture face of the display 24, an embodiment of the NC working system according to the present invention will now be described.

First, the respective working periods consisting of the travelling and idling periods of each of the first and second capstan rests 16 and 18 is obtained in accordance with an automatic program, and the thus obtained working periods are simulatively displayed in bar graph form on the display 24. An operator observes the working periods displayed on the display 24 and recognizes the fact that the travelling periods 100-2 and 104-1 can be simultaneously performed. The operator moves a cursor 30 from its initial position shown in FIG. 4 to the position of the displayed travelling period 100-2 shown in FIG. 5 by suitably operating, in a selection mode, the menu selection switches 28-1, 28-2, 28-3 and 28-4 corresponding to leftward correction shift 26-1, rightward correction shift 26-2, upward correction shift 26-3, and downward correction shift 26-4. Then, in a correction mode, the operator operates the menu selection switch 28-1 corresponding to the leftward correction shift 26-1 to move the cursor 30 leftwardly as shown in FIG. 6 so as to correction shift the travelling periods 100-2, 100-3, 100-4 and 100-5 and the idling period 102-2. Such a correction shift effects a change in the NC apparatus such that working according to the corrected bar diagram may be carried out.

According to the present invention, therefore, it is possible to reduce the working period by correction shifting the travelling and idling periods displayed on the display.

FIG. 7 shows a flowchart according to this embodiment of the present invention.

In FIG. 7, the working program is first registered, the working periods are simulatively displayed on the display, and the time control picture is selected and displayed. The cursor is shifted to the position of a desired travelling or idling period and, for example, the leftward correction shift switch is operated so as to display the working period in a state such that the working period is correction shifted to the left. Then, where the correction editing work has not been completed, the same operations are repeated, while in the case where editing has been completed, the editing operation is ended, and the NC apparatus may be operated according to the work simulation shown on the display.

As described above, according to the present invention, the working period can be reduced by correction shifting the travelling and idling periods on a display.

What is claimed is:

1. In a numerical control working system characterized in that a period of working time consisting of periods of travelling and idling times of respective tool rests is obtained by an automatic program, the improvement comprising means for simultaneously displaying said working time periods as a graph on a display, and means for correction shifting said travelling and idling times so as to reduce the working time period.

2. A system as claimed in claim 1, wherein said working time periods are displayed in the form of bar diagrams, whereby an operator may identify travelling and idling times of said respective rests which may be performed simultaneously.

3. A system as claimed in claim 2, wherein said correction shifting means includes means for selecting a displayed portion of one of said bar diagrams and means for effecting time scale shifting of said selected display portion.

4. A system as claimed in claim 3, said selecting means comprising a movable cursor, and said shifting means comprising control function operators located adjacent said display, said numerical control working system operating to control the operations of said tool rests according to the displayed working time periods.

* * * * *